(12) United States Patent
Harding et al.

(10) Patent No.: US 10,634,350 B2
(45) Date of Patent: Apr. 28, 2020

(54) COMBUSTION CHAMBER AND A COMBUSTION CHAMBER SEGMENT

(71) Applicant: ROLLS-ROYCE plc, London (GB)

(72) Inventors: Stephen C Harding, Bristol (GB);
Paul A Hucker, Bristol (GB);
Giuseppe Rallo, Bristol (GB)

(73) Assignee: ROLLS-ROYCE plc, London (GB)

( * ) Notice: Subject to any disclaimer, the term of this patent is extended or adjusted under 35 U.S.C. 154(b) by 592 days.

(21) Appl. No.: 15/217,142

(22) Filed: Jul. 22, 2016

(65) Prior Publication Data
US 2017/0045227 A1 Feb. 16, 2017

(30) Foreign Application Priority Data

Aug. 13, 2015 (GB) .................................. 1514390.2

(51) Int. Cl.
*F23R 3/00* (2006.01)
*F23R 3/50* (2006.01)
*F02C 3/04* (2006.01)

(52) U.S. Cl.
CPC ................ *F23R 3/002* (2013.01); *F02C 3/04* (2013.01); *F23R 3/50* (2013.01); *F05D 2220/32* (2013.01);
(Continued)

(58) Field of Classification Search
CPC .... F23R 3/002; F23R 3/04; F23R 3/06; F23R 3/42; F23R 3/50; F23R 2900/00005;
(Continued)

(56) References Cited

U.S. PATENT DOCUMENTS

| 2,919,549 A | 1/1960 | Haworth et al. |
| 4,805,397 A | 2/1989 | Barbier et al. |

(Continued)

FOREIGN PATENT DOCUMENTS

| DE | 102008023052 A1 | 12/2009 |
| EP | 1939529 A1 | 7/2008 |

(Continued)

OTHER PUBLICATIONS

Jan. 3, 2017 Search Report issued in European Patent Application No. 16180528.

(Continued)

*Primary Examiner* — Ehud Gartenberg
*Assistant Examiner* — Jacek Lisowski
(74) *Attorney, Agent, or Firm* — Oliff PLC

(57) ABSTRACT

A combustion chamber includes at least one annular wall which includes at least one box like structure and each box like structure includes an inner wall, outer wall, upstream end wall and downstream end wall. The inner wall is spaced radially from the outer wall and the outer wall has a plurality of apertures for the supply of coolant into the box like structure. The inner wall, the outer wall, the upstream end wall and the downstream end wall are integral. The upstream end of the annular wall has features to secure the annular wall to an upstream ring structure and a downstream end of the annular wall has features to mount the annular wall on a downstream ring structure. The inner wall has at least one slot extending through the full thickness of the inner wall to accommodate differential thermal expansion between the inner wall and the outer wall.

16 Claims, 10 Drawing Sheets

(52) U.S. Cl.
CPC .............. *F23R 2900/00005* (2013.01); *F23R 2900/03041* (2013.01); *F23R 2900/03044* (2013.01)

(58) Field of Classification Search
CPC .. F23R 2900/00018; F23R 2900/00017; F23R 2900/03041; F23R 3/60; F02C 3/04; F02C 7/18; F02C 7/20; F02K 1/822; F05B 2260/201; F05B 2260/202; F23D 2211/00; F05D 2270/114; F05D 2260/941; F05D 2900/000018
See application file for complete search history.

(56) References Cited

U.S. PATENT DOCUMENTS

| | | | |
|---|---|---|---|
| 4,901,522 A | 2/1990 | Commaret et al. | |
| 5,509,270 A | 4/1996 | Pearce et al. | |
| 5,605,046 A | 2/1997 | Liang | |
| 6,408,628 B1* | 6/2002 | Pidcock | F23R 3/002 60/752 |
| 7,845,174 B2 | 12/2010 | Parkman et al. | |
| 9,010,122 B2* | 4/2015 | Bangerter | F23R 3/06 60/752 |
| 9,243,801 B2* | 1/2016 | Cunha | F23R 3/002 |
| 2005/0034399 A1 | 2/2005 | Pidcock et al. | |
| 2007/0193248 A1* | 8/2007 | Bessagnet | F23R 3/06 60/39.01 |
| 2009/0293488 A1 | 12/2009 | Coughlan, III et al. | |
| 2010/0095679 A1 | 4/2010 | Rudrapatna et al. | |
| 2011/0126543 A1* | 6/2011 | Kirsopp | F23R 3/002 60/742 |
| 2014/0190171 A1* | 7/2014 | Critchley | F23R 3/005 60/755 |
| 2015/0167977 A1* | 6/2015 | Leglaye | F02C 7/12 60/754 |
| 2016/0010863 A1* | 1/2016 | Ott | F28F 3/04 428/141 |
| 2016/0348913 A1* | 12/2016 | Ott | F23R 3/28 |

FOREIGN PATENT DOCUMENTS

| | | |
|---|---|---|
| EP | 2778532 A1 | 9/2014 |
| EP | 3054218 A1 | 8/2016 |

OTHER PUBLICATIONS

Jan. 27, 2016 Search Report issued in British Patent Application No. 1514390.2.
Sep. 26, 2019 Office Action issued in European Patent Application No. 16180528.8.

* cited by examiner

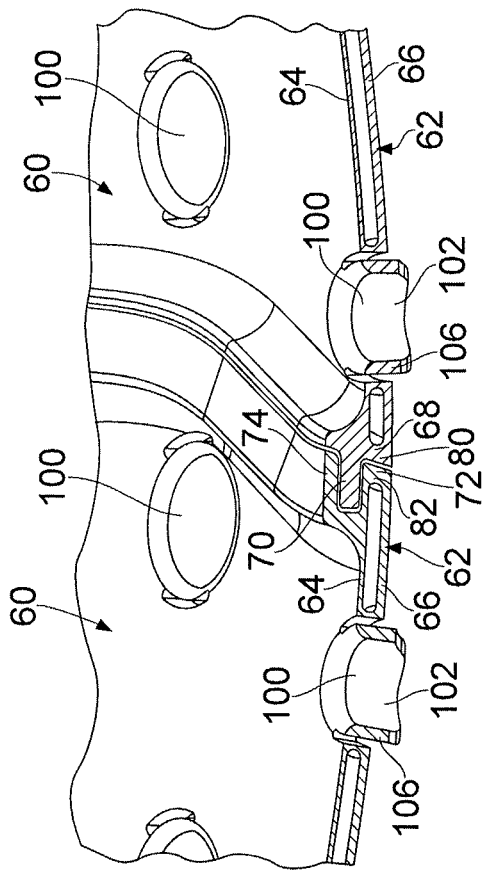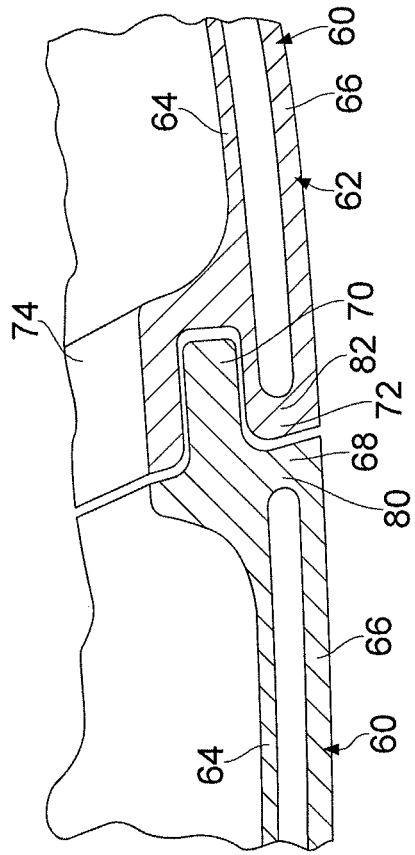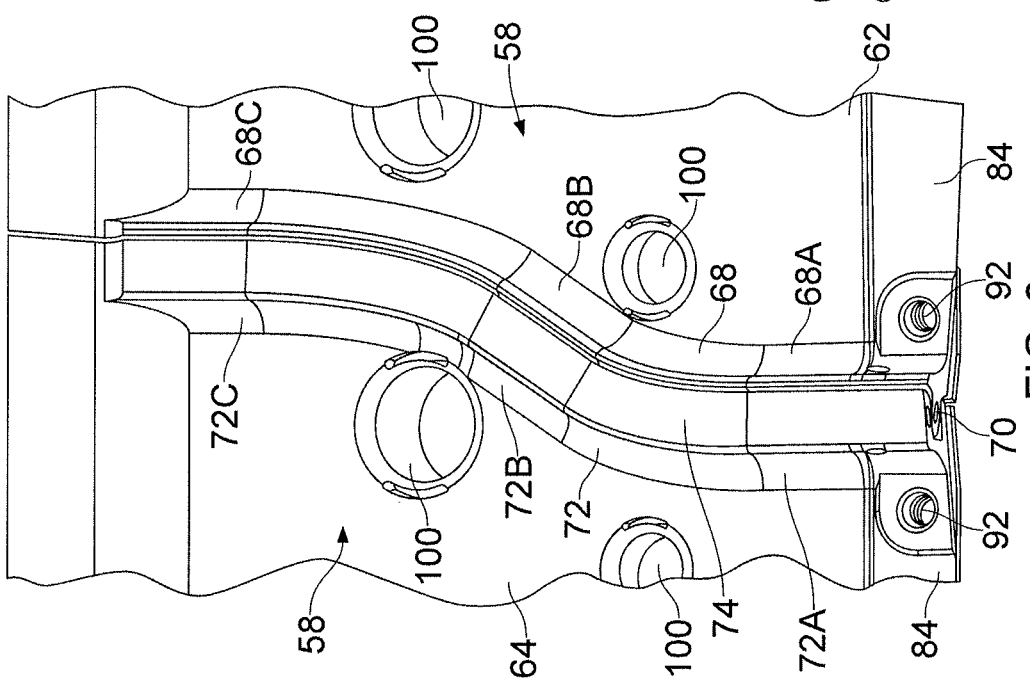

COMBUSTION CHAMBER AND A COMBUSTION CHAMBER SEGMENT

The present disclosure concerns a combustion chamber and a combustion chamber segment and in particular to a gas turbine engine combustion chamber and a gas turbine engine combustion chamber segment.

Currently combustion chambers comprise fabricated sheet liners or forged and machined liners.

More recently developed combustion chambers comprise fabricated sheet outer liners, or forged and machined outer liners, and a plurality of separate tiles each of which is attached to the outer liner. The outer liner is provided with an arrangement of cooling holes to provide impingement cooling of the outer surfaces of the tiles and the tiles are provided with cooling holes to provide effusion, or film, cooling of the inner surfaces of the tiles.

Our published EP patent application EP3054218A1 discloses a combustion chamber in which the outer wall and the inner wall are a single piece structure, a unitary structure or a monolithic piece. However, the combustion chamber may suffer from differential thermal expansion between the outer and inner walls leading to reduction in the working life of the combustion chamber.

Accordingly the present disclosure seeks to provide a combustion chamber which reduces, or overcomes, the above mentioned problem.

According to a first aspect of the disclosure there is provided a combustion chamber comprising at least one annular wall, the at least one annular wall comprising at least one box like structure, the at least one box like structure comprising an inner wall, an outer wall, an upstream end wall and a downstream end wall, the inner wall being spaced radially from the outer wall, the outer wall having a plurality of apertures for the supply of coolant into the box like structure, the inner wall, the outer wall, the upstream end wall and the downstream end wall being integral, the upstream end of the at least one annular wall having features to secure the at least one annular wall to an upstream ring structure and a downstream end of the at least one annular wall having features to mount the at least one annular wall on a downstream ring structure, the inner wall having at least one slot extending through the full thickness of the inner wall to accommodate differential thermal expansion between the inner wall and the outer wall.

The at least one annular wall may comprise a plurality of combustion chamber segments, each combustion chamber segment extending the full length of the at least one annular wall, each combustion chamber segment comprising a box like structure, the box like structure comprising a frame structure, an inner wall and an outer wall, the inner wall being spaced radially from the outer wall, the outer wall having a plurality of apertures for the supply of coolant into the box like structure, the frame structure, the inner wall and the outer wall being integral, the upstream end of each combustion chamber segment having features to secure the combustion chamber segment to the upstream ring structure and the downstream end of each combustion chamber segment having features to mount the combustion chamber segment on the downstream ring structure, the inner wall of each combustion chamber segment having at least one slot extending through the full thickness of the inner wall to accommodate differential thermal expansion between the inner wall and the outer wall.

The box like structure of the combustion chamber segment may have a first end wall extending from a first end of the outer wall to a first end of the inner wall, a second end wall extending from a second, opposite, end of the outer wall to a second, opposite, end of the inner wall, a first edge wall extending from a first edge of the outer wall to a first edge of the inner wall, a second edge wall extending from a second, opposite, edge of the outer wall to a second, opposite, edge of the inner wall to form the box like structure.

According to a second aspect of the disclosure there is provided a combustion chamber segment, the combustion chamber segment extending the full length of the combustion chamber, the combustion chamber segment comprising a box like structure, the box like structure comprising a frame structure, an inner wall and an outer wall, the inner wall being spaced from the outer wall, the outer wall having a plurality of apertures for the supply of coolant into the box like structure, the frame structure, the inner wall and the outer wall being integral, the upstream end of the combustion chamber segment having features to secure the combustion chamber segment to an upstream ring structure and a downstream end of the combustion chamber segment having features to mount the combustion chamber segment on a downstream ring structure, the inner wall having at least one slot extending through the full thickness of the inner wall to accommodate differential thermal expansion between the inner wall and the outer wall.

The inner wall may have a plurality of slots extending through the full thickness of the inner wall to accommodate differential thermal expansion between the inner wall and the outer wall.

The at least one annular wall may have a plurality of circumferentially spaced dilution apertures extending therethrough and each slot may extend between two adjacent dilution apertures. Each slot may extend with axial and circumferential components between the two adjacent dilution apertures. Each slot may comprise a first portion which extends with axial and circumferential components from the first dilution aperture and a second portion which extends with axial and circumferential components from the first portion to the second dilution aperture. Each slot may extend sinusoidally between the two adjacent dilution apertures.

The plurality of slots and dilution apertures may be arranged to form a loop extending through the full thickness of the inner wall to accommodate differential thermal expansion between the inner wall and the outer wall. The slot may be arranged to form a loop extending through the full thickness of the inner wall to accommodate differential thermal expansion between the inner wall and the outer wall.

At least one of the surfaces of the at least one slot may be arranged at an angle of up to 60° to the surface of the inner wall. The at least one surface of the at least one slot may be arranged at an angle of between 10° and 60° to the surface of the inner wall. The at least one surface of the at least one slot may be arranged at an angle of between 10° and 50° to the surface of the inner wall. The at least one surface of the at least one slot may be arranged at an angle of between 10° and 40° to the surface of the inner wall. The at least one surface of the at least one slot may be arranged at an angle of between 10° and 30° to the surface of the inner wall. The at least one surface of the at least one slot may be arranged at an angle of 15° to the surface of the inner wall. The at least one surface of the at least one slot may be arranged at an angle of 25° to the surface of the inner wall.

Both surfaces of the at least one slot may be arranged at an angle of up to 60° to the surface of the inner wall. Both surfaces of the at least one slot may be arranged at an angle of between 10° and 60° to the surface of the inner wall. Both surfaces of the at least one slot may be arranged at an angle of between 10° and 50° to the surface of the inner wall. Both surfaces of the at least one slot may be arranged at an angle of between 10° and 40° to the surface of the inner wall. Both surfaces of the at least one slot may be arranged at an angle of between 10° and 30° to the surface of the inner wall. Both surfaces of the at least one slot may be arranged at an angle of 15° to the surface of the inner wall. Both surfaces of the at least one slot may be arranged at an angle of 25° to the surface of the inner wall. The surfaces of the slot may be parallel. Both surfaces of the slot may be arranged at an angle to the inner surface of the inner wall and the outer surface of the inner wall.

The slot may be defined between a downstream portion and an upstream portion of the inner wall.

The slot may be defined between two parallel surfaces, the surfaces being arranged at an angle to the inner surface of the inner wall and at an angle to the outer surface of the inner wall. The slot may intersect the inner surface of the inner wall at a position downstream of the position at which the slot intersects the outer surface of the inner wall. The parallel surfaces may be arranged on upstream and downstream portions of the inner wall.

The downstream end of the upstream portion may have a surface being arranged at an angle to the inner surface of the inner wall and at an angle to the outer surface of the inner wall and the upstream end of the downstream portion having a surface arranged at an angle to the inner surface of the inner wall and at an angle to the outer surface of the inner wall.

The downstream end of the upstream portion may have a first surface portion extending perpendicularly from the inner surface of the inner wall, a second portion extending parallel to the inner surface and the outer surface of the inner wall and a third portion extending perpendicularly to the outer surface of the inner wall, the upstream end of the downstream portion may have a first portion extending at an angle to the inner surface of the inner wall, a second portion extending parallel to the inner surface and the outer surface of the inner wall and a third portion extending perpendicularly to the outer surface of the inner wall.

The box like structure of the combustion chamber segment may have a first end wall extending from a first end of the outer wall to a first end of the inner wall, a second end wall extending from a second, opposite, end of the outer wall to a second, opposite, end of the inner wall, a first edge wall extending from a first edge of the outer wall to a first edge of the inner wall, a second edge wall extending from a second, opposite, edge of the outer wall to a second, opposite, edge of the inner wall to form the box like structure.

A plurality of members may be secured to and interconnect the inner wall and the outer wall. The members may be integral with the inner wall and the outer wall. A cellular structure may be secured to and interconnect the inner wall and the outer wall. The cellular structure may be integral with the inner wall and the outer wall.

The at least one annular wall may be an annular wall of a tubular combustion chamber. The at least one annular wall may be a radially inner annular wall of an annular combustion chamber. The at least one annular wall may be a radially outer annular wall of an annular combustion chamber.

The combustion chamber may be a gas turbine engine combustion chamber.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which:

FIG. 6 is a further enlarged perspective view of a cold side of portions of the edges of two adjacent combustion chamber segments shown in FIG. 3.

FIG. 7 is a cross-sectional view through portions of the edges of two adjacent combustion chamber segments shown in FIG. 6.

FIG. 8 is a further enlarged cross-sectional view through the portions of the edges of two adjacent combustion chamber segments shown in FIG. 7.

Figure 1:
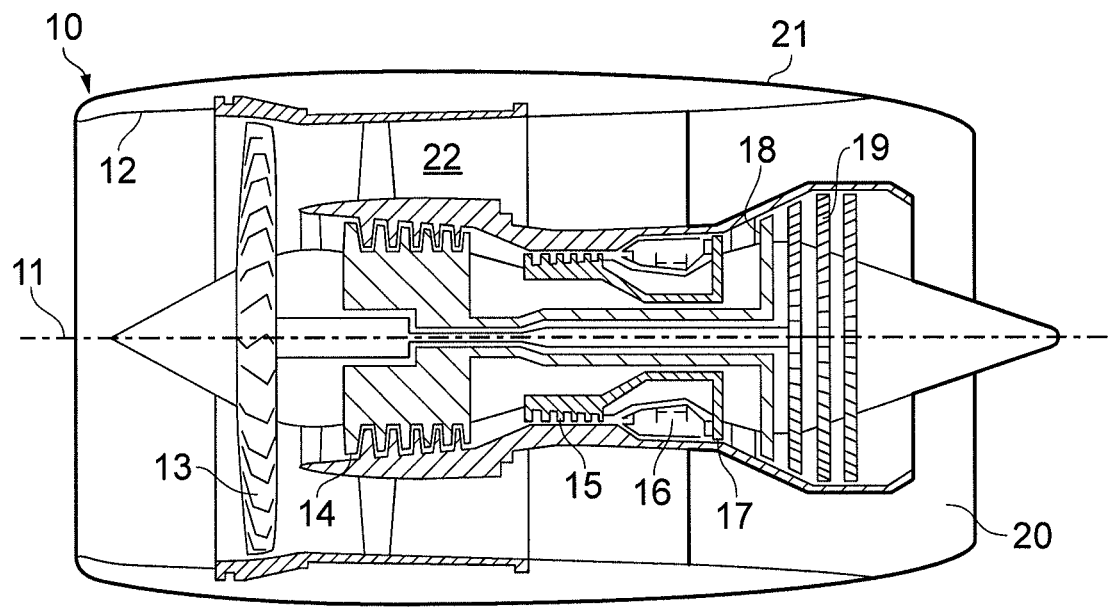
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
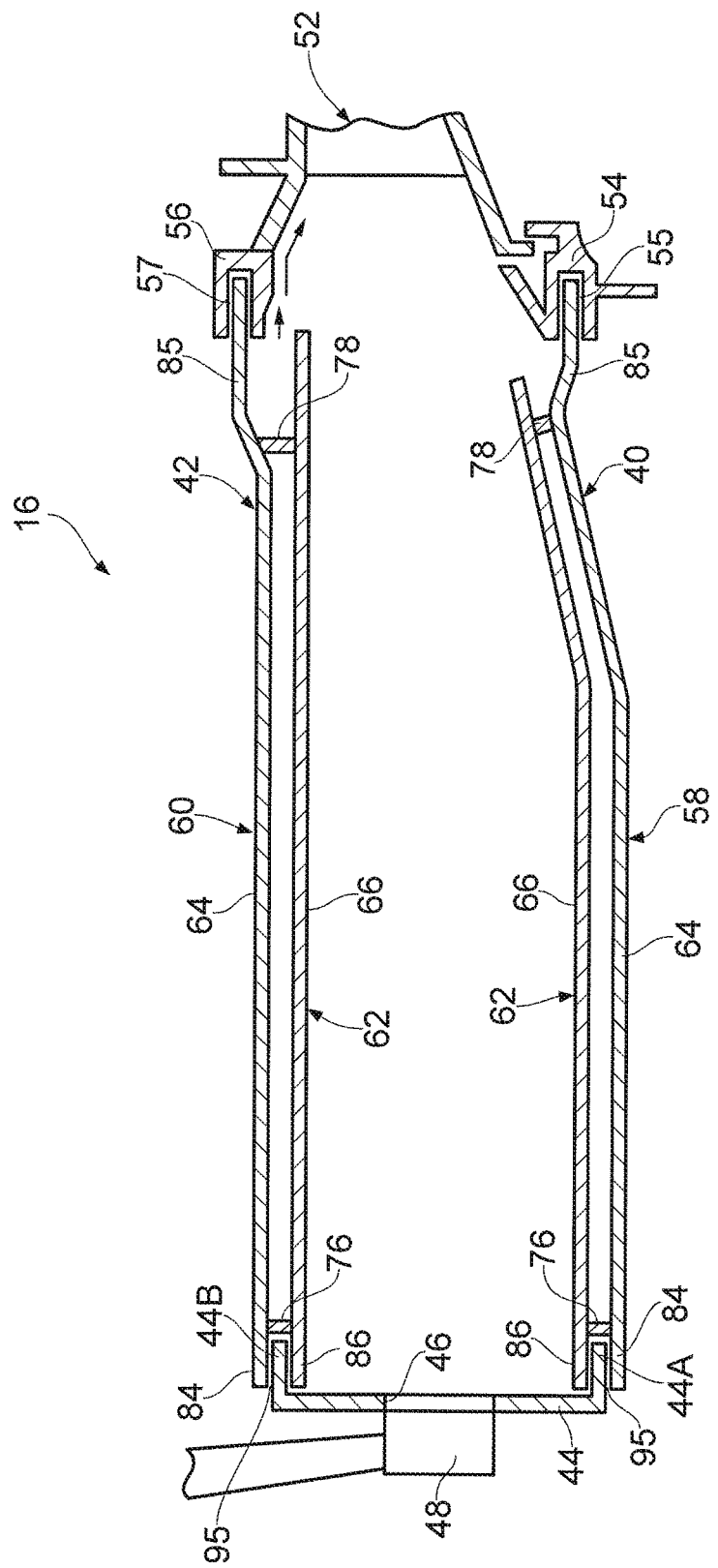
FIG. 2 is an enlarged sectional view through the combustion equipment of FIG. 1.

The combustion chamber 16, as shown more clearly in FIG. 2, is an annular combustion chamber and comprises a radially inner annular wall structure 40, a radially outer annular wall structure 42 and an upstream end wall structure 44. The upstream end of the radially inner annular wall structure 40 is secured to the upstream end wall structure 44 and the upstream end of the radially outer annular wall structure 42 is secured to the upstream end wall structure 44. The upstream end wall structure 44 has a plurality of circumferentially spaced apertures 46 and each aperture 46 has a respective one of a plurality of fuel injectors 48 located therein. The fuel injectors 48 are arranged to supply fuel into the annular combustion chamber 16 during operation of the gas turbine engine 10. A plurality of circumferentially arranged turbine nozzle guide vanes 52 are positioned axially downstream of the combustion chamber 16 and arranged to direct the hot gases from the combustion chamber 16 into the high pressure turbine 17. The radially inner ends of the turbine nozzle guide vanes 52 are secured to a radially inner discharge nozzle 54 and the radially outer ends of the turbine nozzle guide vanes 52 are secured to a radially outer discharge nozzle 56.

The radially inner discharge nozzle 54 forms a radially inner downstream ring structure and the radially outer discharge nozzle 56 forms a radially outer downstream ring structure. The upstream end wall structure 44 has an inner annular flange 44A extending in an axially downstream direction therefrom and an outer annular flange 44B extending in an axially downstream direction therefrom. The upstream end wall structure 44 forms a radially inner upstream ring structure and a radially outer upstream ring structure. The radially inner annular wall structure 40 of the annular combustion chamber 16 and the radially outer annular wall structure 42 of the annular combustion chamber 16 comprise a plurality of circumferentially arranged combustion chamber segments 58 and 60 respectively. It is to be noted that the combustion chamber segments 58, 60 extend the full axial, longitudinal, length of the combustion chamber 16.

Figure 3:
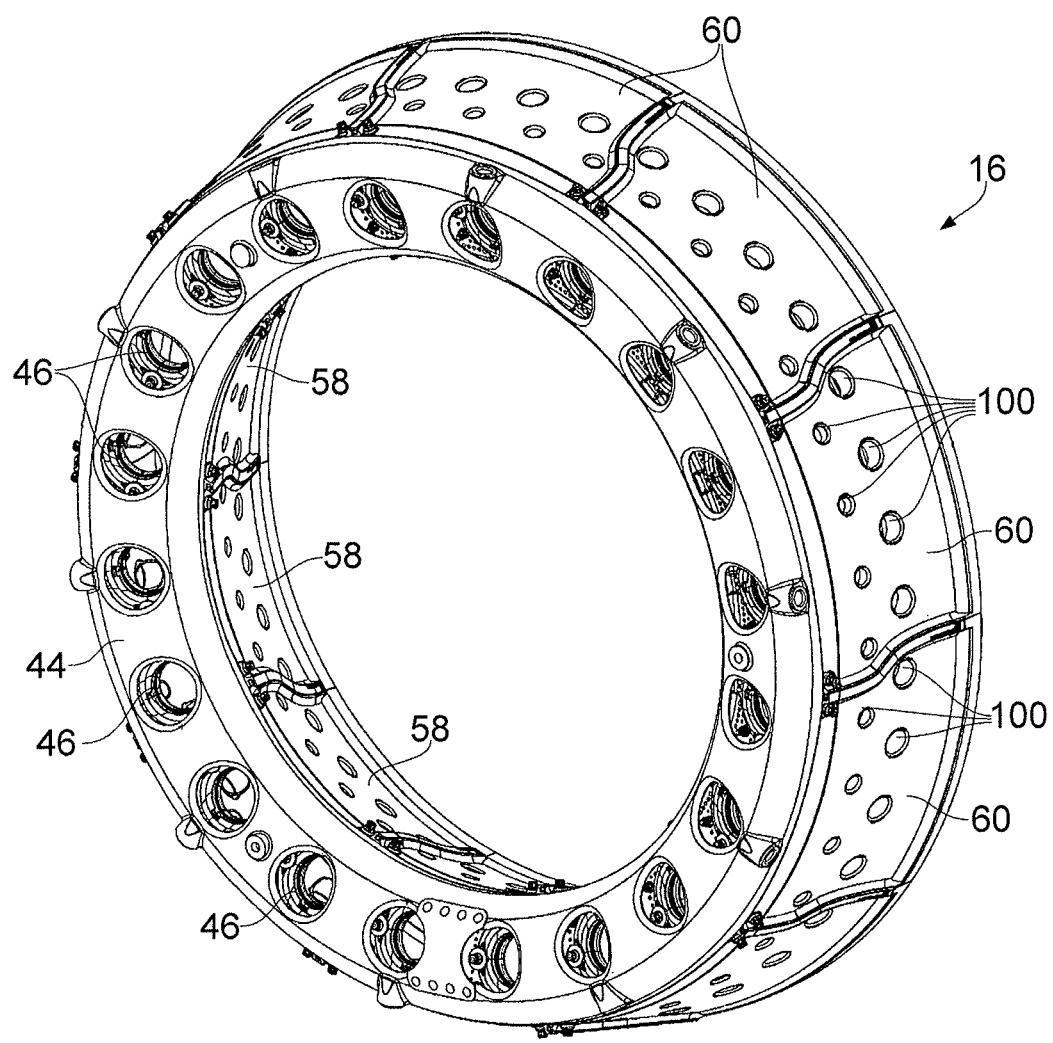
FIG. 3 is a perspective view of a combustion chamber comprising combustion chamber segments according to the present disclosure.

The circumferential arrangement of combustion chamber segments 58 and 60 of the radially inner and radially outer annular wall structures 40 and 42 of the annular combustion chamber 16 are clearly shown in FIG. 3. In this example there are ten combustion chamber segments 58 and ten combustion chamber segments 60 and each combustion chamber segment 58 and 60 extends through an angle of 36°. Other suitable numbers of combustion chamber segments 58 and 60 may be used, e.g. two, three, four, five, six, eight or twelve, and the number of combustion chamber segments 58 may be the same as or different to the number of combustion chamber segments 60. It is preferred that each of the combustion chamber segments extends through the same angle, but it may be possible to arrange the combustion chamber segments to extend through different angles.

Each combustion chamber segment 58 and 60, as shown in FIGS. 4 to 8, comprises a box like structure 62 including an outer wall 64 and an inner wall 66 spaced from the outer wall 64. The outer wall 64 and the inner wall 66 are arcuate. FIGS. 4 to 8 show a combustion chamber segment 58 of the radially inner annular wall structure 40. The outer wall 64 has a plurality of apertures 69 for the supply of coolant into the box like structure 62 and the inner wall 66 has a plurality of apertures 67 for the supply of coolant out of the box like structure 62. A first edge 68 of the box like structure 62 has a first hook 70 extending from the outer wall 64 and away from the inner wall 66. The first hook 70 extends at least a portion of the axial, longitudinal, length of the box like structure 62 and the first hook 70 is arranged at a first radial distance from the outer wall 64. A second edge 72 of the box like structure 62 has a second hook 74 extending from the outer wall 64 and away from the inner wall 66. The second hook 74 extends at least a portion of the axial, longitudinal, length of the box like structure 62, the second hook 74 is arranged at a second radial distance from the outer wall 64 and the second radial distance is greater than the first radial distance. The first hook 70 of each combustion chamber segment 58, 60 engages the outer wall 64 at the second edge 72 of an adjacent combustion chamber segment 58, 60 and the second hook 74 of each combustion chamber segment 58, 60 engages the first hook 70 of an adjacent combustion chamber segment 58, 60 to form a seal and to distribute loads between the adjacent combustion chamber segments 58, 60 and to maintain a circular profile, shape, for the radially inner, or radially outer, annular wall structure 40 and 42 of the annular combustion chamber 16, e.g. to prevent dislocation of the combustion chamber segments 58, 60. Thus, the first hook 70 of each combustion chamber segment 58, 60 contacts, abuts, or is in close proximity to the surface of the outer wall 64 at the second edge 72 of the adjacent combustion chamber segment 58, 60 and the second hook 74 of each combustion chamber segment 58, 60 contacts, abuts, or is in close proximity to the surface of the first hook 70 at the first edge 68 of the adjacent combustion chamber segment 58, 60. The first hook 70 of each combustion chamber segment 60 is arranged radially outwardly of the outer wall 64 at the second edge 72 of the adjacent combustion chamber segment 60 and the second hook 74 of each combustion chamber 60 is arranged radially outwardly of the first hook 70 at the first edge 68 of the adjacent combustion chamber segment 60. Similarly, the first hook 70 of each combustion chamber segment 58 is arranged radially inwardly of the outer wall 64 at the second edge 72 of the adjacent combustion chamber segment 58 and the second hook 74 of each combustion chamber 58 is arranged radially inwardly of the first hook 70 at the first edge 68 of the adjacent combustion chamber segment 58.

The upstream end of each combustion chamber segment 58, 60 is secured to the upstream ring structure and the downstream end of each combustion chamber segment is mounted on the downstream ring structure. Thus, the upstream end of each combustion chamber segment 58 is secured to the upstream ring structure, e.g. the upstream end wall structure, 44 and the downstream end of each combustion chamber segment 58 is mounted on the radially inner downstream ring structure, e.g. the radially inner discharge nozzle, 54. Similarly, the upstream end of each combustion chamber segment 60 is secured to the upstream ring structure, e.g. the upstream end wall structure, 44 and the downstream end of each combustion chamber segment 60 is mounted on the radially outer downstream ring structure, e.g. the radially outer discharge nozzle, 56.

The first hook 70 extends the length of the box like structure 62 between a securing arrangement and a mounting arrangement and the second hook 74 also extends the length of the box like structure 62 between the securing arrangement and the mounting arrangement. The securing arrangement and the mounting arrangement are discussed further below.

However, it may be possible for the first hook to extend the full length of the box like structure and for the second hook to extend the full length of the box like structure. Alternatively, it may be possible for the first hook to extend only a part of the full length of the box like structure and for the second hook to extend only a part of the full length of the box like structure. Additionally, it may be possible for there to be a plurality of first hooks arranged along the length of the box like structure and for there to be a number of second hooks arranged along the length of the box like structure.

The box like structure 62 of each combustion chamber segment 58, 60 has a first end wall 76 extending from a first, upstream, end of the outer wall 64 to a first, upstream, end of the inner wall 66, a second end wall 78 extending from a second, downstream and opposite, end of the outer wall 64 to a second, downstream and opposite, end of the inner wall 66, as shown in FIG. 2, a first edge wall 80 extending from a first circumferential edge of the outer wall 64 to a first circumferential edge of the inner wall 66, a second edge wall 82 extending from a second, opposite circumferential, edge of the outer wall 64 to a second, opposite circumferential, edge of the inner wall 66 to form the box like structure 62, as shown in FIGS. 7 and 8.

The first and second edges 68 and 72 of the combustion chamber segments 58, 60 are axially profiled so that the at least some of the apertures 67 in the inner wall 66 direct coolant over at least a portion of one of the edges 68 and 72 of the combustion chamber segment 58, 60, as shown in FIGS. 3 to 6. In this particular example first and second edges 68 and 72 of each combustion chamber segment 58, 60 has a first portion 68A, 72A extending with a purely axial component, a second portion 68B, 72B extending with axial and circumferential components and a third portion 68C, 72C extending with a purely axial component. Thus, the first and second edges 68 and 72 of each combustion chamber segment 58, 60 are profiled so that the at least some of the apertures 67A in the inner wall 66 near the first edge 68 direct coolant over at least a portion of the second edge 70 of an adjacent combustion chamber segment 58, 60. In particular the apertures 67A in the inner wall 66 near the first edge 68 in the first and second portions 68A and 68B of each combustion chamber segment 58, 60 direct coolant in a generally axially downstream direction across the gap between the first edge 68 of the combustion chamber segment 58, 60 and the second edge 72 of the adjacent combustion chamber segment 58, 60 and then over the second and third portions 72B and 72C of the adjacent combustion chamber segment 58, 60.

Alternatively, the first and second edges of the combustion chamber segments may extend with axial and circumferential components or the first and second edges of the combustion chamber segments may be S-shaped or W-shaped.

The box like structure 62 of each combustion chamber segment 58, 60 comprises a frame 75. The frame 75 comprises the first and second end walls 76 and 78 and the first and second edge walls 80 and 82. The first and second end walls 76 and 78 and the first and second edge walls 80 and 82 are integral, e.g. one piece. The frame 75 of each combustion chamber segment 58, 60 is radially thicker, and stiffer, than the outer wall 64 and the inner wall 66 and the first and second end walls 76 and 78 and the first and second edge walls 80 and 82 are thicker axially and thicker circumferentially respectively than the radial thickness of the outer and inner walls 64 and 66 in order to carry loads and interface with adjacent combustion chamber segments 58, 60 and the upstream ring structure and the downstream ring structure. The frame 75 of each combustion chamber segment 58, 60 is arranged to carry the structural loads, the thermal loads, surge loads and flameout loads. The first hook 70 is provided on the first edge wall 80 and the second hook 74 is provided on the second edge wall 82. In other words the box like structure 62 of each combustion chamber segment 58, 60 comprises the frame 75 and portions of the outer and inner walls 64 and 66 extending axially, longitudinally, between the first and second end walls 76 and 78 and extending circumferentially, laterally, between the first and second edge walls 80 and 82 and the box like structure 62 is an integral structure, e.g. one piece structure or a monolithic structure.

The first, upstream, end of the outer wall 64 of each combustion chamber segment 58, 60 has a flange 84 and the flange 84 has at least one locally thicker region 88, each locally thicker region 88 of the outer wall 64 has an aperture 92 extending there-through. The first, upstream, end of the inner wall 66 has a flange 86 and the flange 86 has at least one locally thicker region 90, each locally thicker region 90 of the inner wall 66 has an aperture 94 extending there-through. The at least one locally thicker region 88 at the first end of the outer wall 64 is arranged such that the aperture 92 is aligned with the aperture 94 through the corresponding locally thicker region 90 of the inner wall 66 and an annular slot 95 is formed between the flange 84 of the first end of the inner wall 66 and the flange 86 of the first end of the outer wall 66. The flange 84 at the first end of the outer wall 64 and the flange 86 at the first end of the inner wall 66 of each combustion chamber segment 58, 60 have a plurality of locally thickened regions 88, 90 respectively and the locally thicker regions 88, 90 are spaced apart circumferentially, laterally, between the first and second edges 68, 70 of the outer and inner walls 64 and 66 of the combustion chamber segments 58, 60. The aperture 94 in the at least one, or each, locally thickened region 90 of the inner wall 66 of each combustion chamber segment 58, 60 is threaded.

Each combustion chamber segment 58, 60 is secured to the upstream end wall structure 44 by one or more bolts 96. Each combustion chamber segment 58 is positioned such that the inner annular flange 44A of the upstream end wall structure 44 is located radially between the flanges 84 and 86 at the upstream end of the combustion segment 58 and such that the apertures 92 and 94 in the flanges 84 and 86 are aligned with a corresponding one of a plurality of circumferentially spaced apertures 45A in the flange 44A of the upstream end wall structure 44. Bolts are inserted through the aligned apertures 92 and 45A and threaded into the apertures 94 to secure the combustion chamber segment 58 to the upstream end wall structure 44. Similarly, each combustion chamber segment 60 is positioned such that the inner annular flange 44B of the upstream end wall structure 44 is located radially between the flanges 84 and 86 at the upstream end of the combustion segment 60 and such that the apertures 92 and 94 in the flanges 84 and 86 are aligned with a corresponding one of a plurality of circumferentially spaced apertures 45B in the flange 44B of the upstream end wall structure 44. Bolts are inserted through the aligned apertures 92 and 45A and threaded into the apertures 94 to secure the combustion chamber segment 60 to the upstream end wall structure 44. Alternatively, rivets may be inserted through the aligned apertures 92 and 45A and the apertures 94 to secure the combustion chamber segment 60 to the upstream end wall structure 44.

The second hook 74 of each combustion chamber segment 58, 60 forms a groove and the first hook 70 forms a tongue. The second hook 74 of each combustion chamber segment 58, 60 may form a dovetail shaped groove and the first hook 70 of each combustion chamber segment 58, 60 may form a dovetail shaped tongue.

Each combustion chamber segment 58 is mounted on the radially inner downstream ring structure, e.g. the radially inner discharge nozzle, 54. The second, downstream, end of the outer wall 64 of each combustion chamber segment 58 has a flange 85 and the flange 85 of each combustion chamber segment 58 is positioned in an annular slot 55 formed in the radially inner discharge nozzle 54, as shown in FIG. 2. Each combustion chamber segment 60 is mounted on the radially outer downstream ring structure, e.g. the radially outer discharge nozzle, 56. The second, downstream, end of the outer wall 64 of each combustion chamber segment 60 has a flange 85 and the flange 85 of each combustion chamber segment 60 is positioned in an annular slot 57 formed in the radially outer discharge nozzle 56, also shown in FIG. 2.

The outer wall 66 of each combustion chamber segment 58, 60 has at least one dilution aperture 100, the inner wall 66 of each combustion chamber segment 58, 60 has at least one dilution aperture 102 aligned with the corresponding dilution aperture 100 in the outer wall 64. At least one dilution wall extends from the periphery of the corresponding dilution aperture 100 in the outer wall 64 to the periphery of the corresponding dilution aperture 102 in the inner wall 66. The inner wall 66 of each combustion chamber segment 58, 60 has at least one dilution chute 106, the at least one dilution chute 106 extends from the inner wall 66 in a radial direction away from the inner wall 66 and the outer wall 66 and each dilution chute 106 is aligned with a corresponding one of the dilution apertures 102 in the inner wall 66, as shown in FIGS. 4 to 7. In this example there are a plurality of dilution apertures 100, corresponding dilution apertures 102, dilution walls and dilution chutes 106.

However, if the combustion chamber 16 is a lean burn combustion chamber the combustion chamber segments 58, 60 are not provided with dilution apertures, dilution walls and dilution chutes.

The apertures 69 in the outer wall 64 of each combustion chamber segment 58, 60 may be arranged perpendicularly to the surface of the outer wall 64 and the apertures 67 in the inner wall 66 of each combustion chamber segment 58, 60 may be arranged perpendicularly to the surface of the inner wall 66 or at non-perpendicular angle to the surface of the inner wall 66 so that the apertures 69 in the outer wall provide impingement cooling of the inner wall 66 and the apertures 67 in the inner wall 66 provide effusion, or film, cooling of the inner wall 66. The apertures 67 in the inner wall 66 of each combustion chamber segment 58, 60 arranged at a non-perpendicular angle to the surface of the inner wall 66 may be angled in a longitudinal, axial, direction. The apertures 67 in the inner wall 66 of each combustion chamber segment 58, 60 may have a fan shaped outlet or other suitable shapes of outlets may be used. The apertures 69 in the outer wall 64 of each combustion chamber segment may have bell mouth shaped inlets or other suitable shapes of inlets may be used. The apertures 69 provide impingement cooling of the inner wall 66.

The inner wall 66 of each combustion chamber segment 58, 60 may have a plurality of pedestals extending from the inner wall 66 towards the outer wall 64 to provide additional cooling of the inner wall 66. The pedestals extending from the inner wall 66 towards the outer wall 64 may extend all the way to the outer wall 64 such that the pedestals, the inner wall 66 and the outer wall 64 are integral, e.g. one piece. Each combustion chamber segment 58, 60 may have U shaped effusion cooling apertures extending through the inner wall 66. The U shaped effusion cooling apertures in the inner wall 66 of each combustion chamber segment 58, 60 may have a fan shaped outlet. The inlets and outlets of the U shaped effusion cooling apertures may be arranged axially, longitudinally, downstream of a U shaped bend on the U shaped effusion cooling aperture.

Alternatively, each combustion chamber segment 58, 60 may have a cellular structure between the inner wall 66 and the outer wall 66, the cellular structure comprising a plurality of polyhedron shaped chambers defined by a matrix of integral interconnected walls, the polyhedron shaped chambers are arranged in at least two layers between the inner wall 66 and the outer wall 64. At least some of the polyhedron shaped chambers in each layer are fluidly interconnected to at least some of the polyhedron shaped chambers in each adjacent layer by apertures extending through the integral interconnected walls of the polyhedron shaped chambers for the flow of coolant there-between. The apertures in the outer wall 64 allow a flow of coolant into the cellular structure and the apertures in the inner wall 66 allow a flow of coolant out of the cellular structure. The polyhedron shaped chambers may be parallelogram sided cuboid shaped chambers, square based pyramid shaped chambers, rhombic dodecahedron shaped chambers, elongated dodecahedron shaped chambers, truncated dodecahedron shaped chambers, spherical shaped chambers, spheroid shaped chambers or two types of irregular polyhedron shaped chambers arranged in a Weaire-Phelan structure. Spheroid shaped chambers includes elliptical or similar shaped chambers.

The cellular structure and the box like structure is an integral structure, e.g. a single piece structure, a unitary structure or a monolithic structure. In the case of a combustion chamber segment the box like structure comprising the frame structure, the inner wall, the outer wall, and the cellular structure is an integral structure, e.g. a single piece structure, a unitary structure or a monolithic structure. In the case of an annular wall the box like structure comprising the inner wall, the outer wall, the upstream end wall, the downstream end wall and the cellular structure is an integral structure, e.g. a single piece structure, a unitary structure or a monolithic structure. The thickness of the wall of the polyhedron shaped chamber may be in the range of 0.2 to 2 mm. The distance between the walls of the polyhedron shaped chambers may be in the range of 1 to 4 mm.

Figure 4:
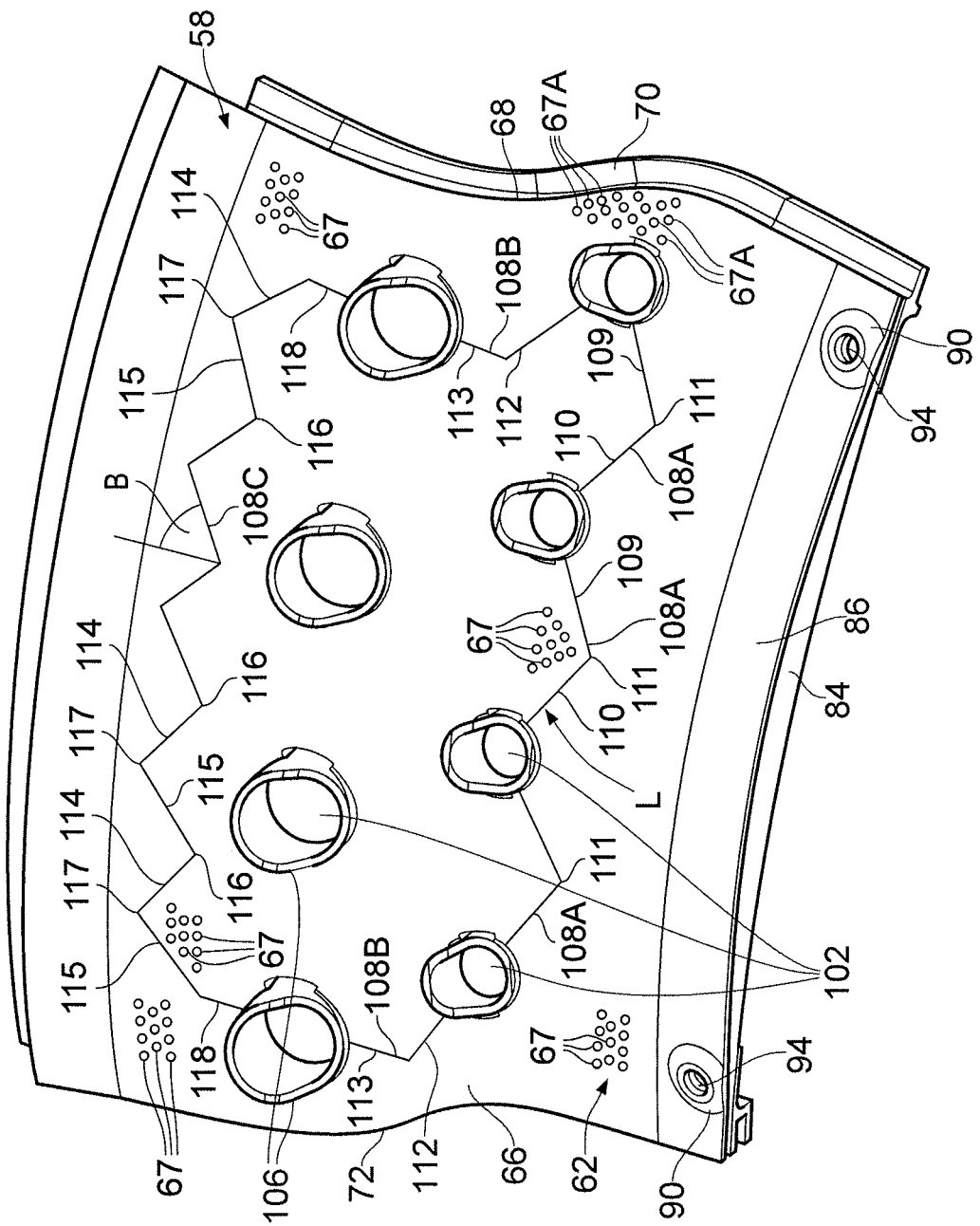
FIG. 4 is a further enlarged perspective view of a hot side of a combustion chamber segment shown in FIG. 3.
Figure 5:
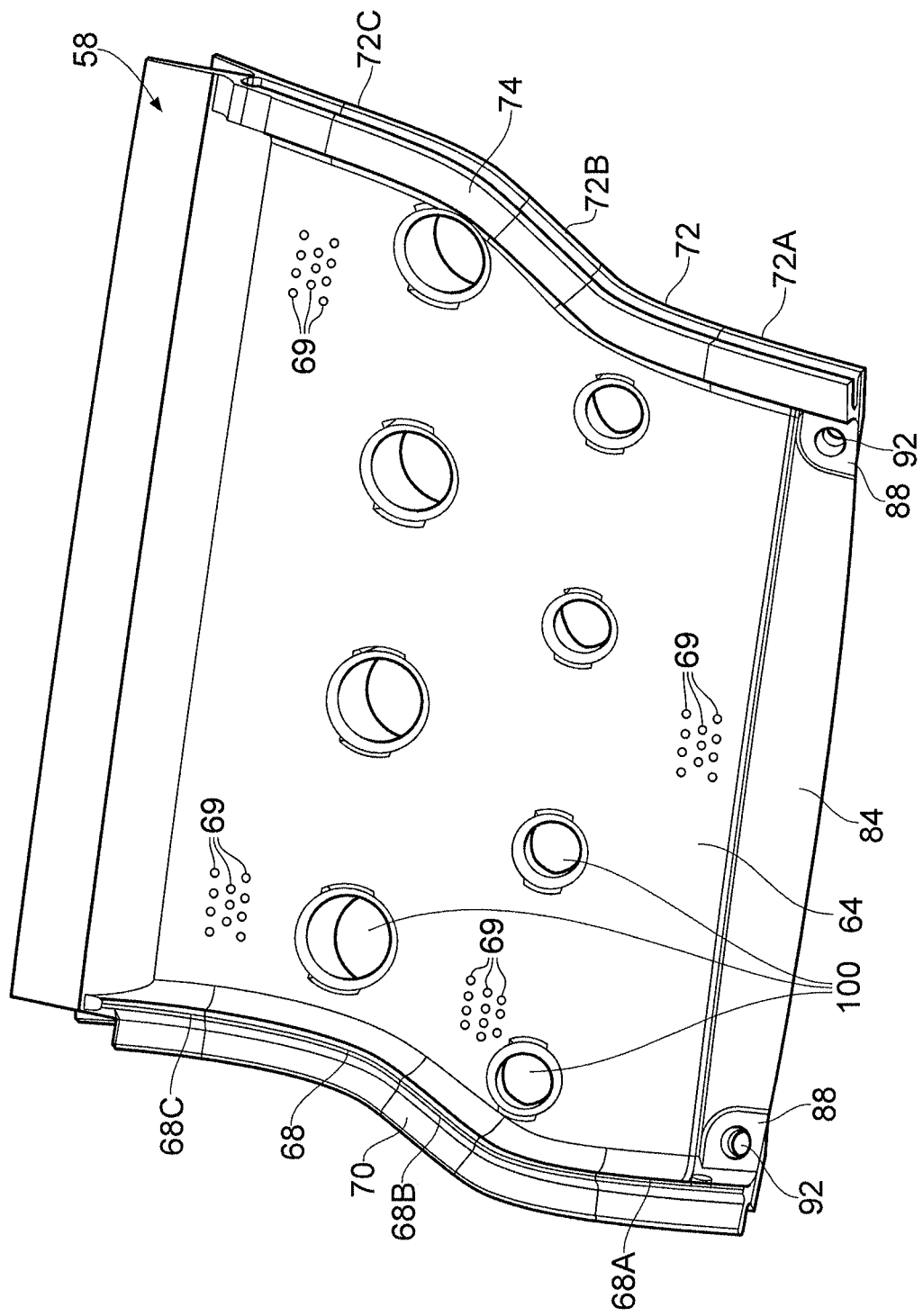
FIG. 5 is a further enlarged perspective view of a cold side of a combustion chamber segment shown in FIG. 3.

The inner wall 66 of each combustion chamber segment 58, 60 has at least one slot 108 extending through the full thickness of the inner wall 66 to accommodate differential thermal expansion between the inner wall 66 and the outer wall 64. The inner wall 66 of each combustion chamber segment 58, 60 has a plurality of slots 108A, 108B and 108C extending through the full thickness of the inner wall 66 to accommodate differential thermal expansion between the inner wall 66 and the outer wall 64, as shown in FIG. 4. Each slot 108A, 108B and 108C in the inner wall 66 of each combustion chamber segment 58, 60 extends between two dilution apertures 102 in the inner wall 66. Each slot 108A, 108B and 108C extends with axial and circumferential components between the two dilution apertures 102 in the inner wall 66. Each slot 108A comprises a first portion 109 which extends with axially upstream and circumferential components from the first dilution aperture 102 and a second portion 110 which extends with axially downstream and circumferential components from the first portion 109 to the second dilution aperture 102. Thus, it is seen that each slot 108A is V-shaped in the plane of the inner wall 66 and the apex 111 of each V-shaped slot 108A is axially upstream of the ends of the slot 108A. Each slot 108B comprises a first portion 112 which extends with axially downstream and circumferential components from the first dilution aperture 102 and a second portion 113 which extends with an axially downstream component from the first portion 112 to the second dilution aperture 102. Thus, it is seen that each slot 108B is also V-shaped in the plane of the inner wall 66. The slot 108C comprises a plurality of portions 114 and 115 which extend with axial and circumferential components and two portions 118 which extend with axial components from the dilution aperture 102 to the second aperture 102 such that the slot 108C extends sinusoidally, e.g. in a zig-zag manner, in the plane of the inner wall 66 between the two adjacent dilution apertures 102. The portions 114 and 115 extend between axially upstream apexes 116 and axially downstream apexes 117. The plurality of slots 108A, 108B and 108C and the dilution apertures 102 are arranged to form a loop L extending through the full thickness of the inner wall 66 to accommodate differential thermal expansion between the inner wall 66 and the outer wall 64 of each combustion chamber segment 58, 60. Each slot 108A extends between two adjacent dilution apertures 102 in a first row of circumferentially spaced dilution apertures 102. Each slot 108B extends between a dilution aperture 102 in the first row of dilution apertures 102 and a dilution aperture 102 in a second row of dilution apertures 102 where the first and second rows of dilution apertures 102 are axially spaced. The slot 108C extends between two dilution apertures 102 in the second row of circumferentially spaced dilution apertures 102. In each slot 108A, 108B and 108C there may be a small radius of curvature at the, or each, apex to minimise the risk of any crack initiation due to the change in the angle of the slot 108A, 108B, and/or 108C. The small radius may be less than 3 mm.

Figure 11:
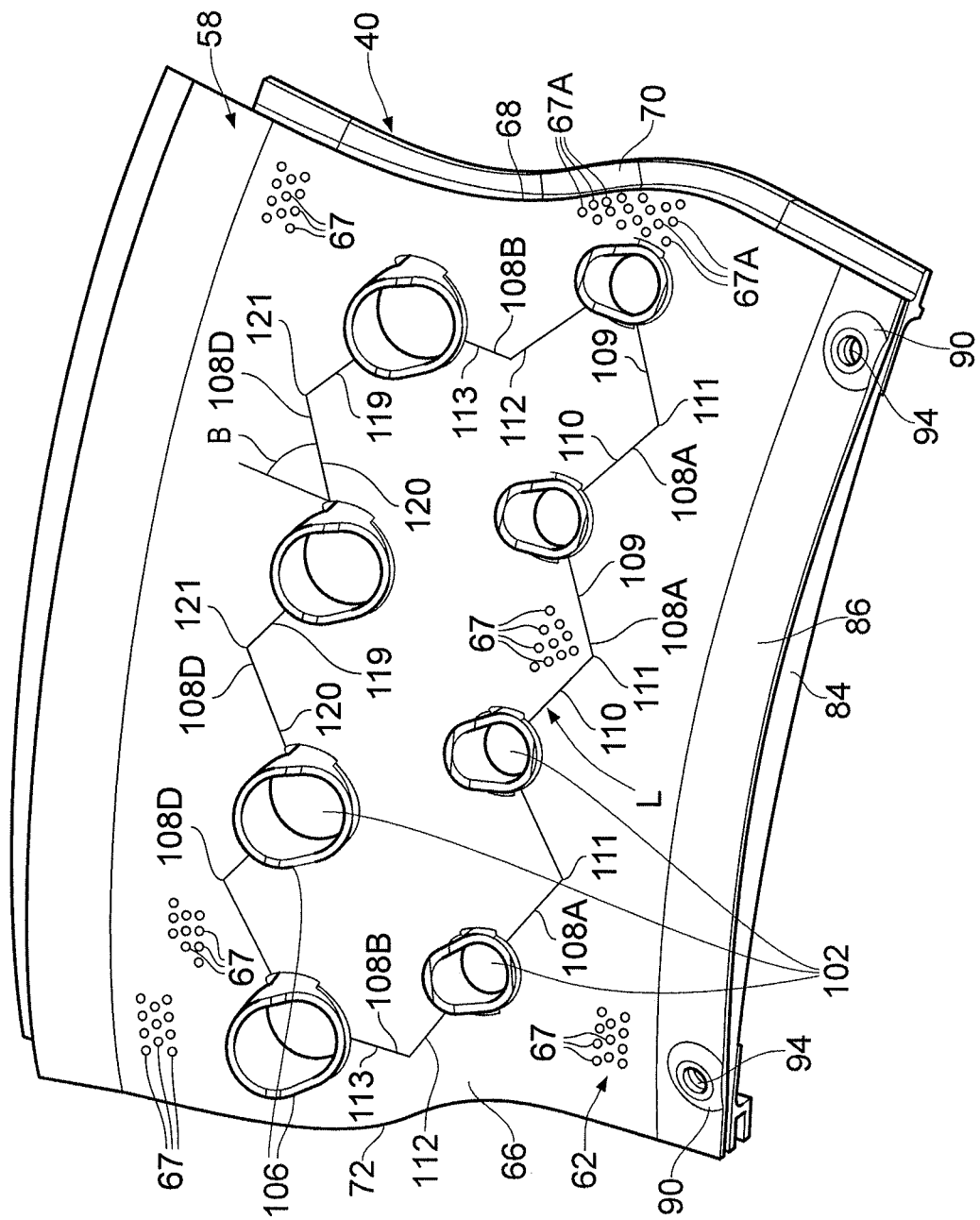
FIG. 11 is a further enlarged perspective view of a hot side of an alternative combustion chamber segment shown in FIG. 3.

The inner wall 66 of each combustion chamber segment 58, 60 has a plurality of slots 108A, 108B and 108D extending through the full thickness of the inner wall 66 to accommodate differential thermal expansion between the inner wall 66 and the outer wall 64, as shown in FIG. 11. Each slot 108A, 108B and 108D in the inner wall 66 of each combustion chamber segment 58, 60 extends between two dilution apertures 102 in the inner wall 66. Each slot 108A, 108B and 108D extends with axial and circumferential components between the two dilution apertures 102 in the inner wall 66. Each slot 108A comprises a first portion 109 which extends with axially upstream and circumferential components from the first dilution aperture 102 and a second portion 110 which extends with axially downstream and circumferential components from the first portion 109 to the second dilution aperture 102. Thus, it is seen that each slot 108A is V-shaped in the plane of the inner wall 66 and the apex of each V-shaped slot 108A is axially upstream of the ends of the slot 108A. Each slot 108B comprises a first portion 112 which extends with axially downstream and circumferential components from the first dilution aperture 102 and a second portion 113 which extends with an axially downstream component from the first portion 112 to the second dilution aperture 102. Thus, it is seen that each slot 108B is also V-shaped in the plane of the inner wall 66. Each slot 108D comprises a first portion 119 which extends with axially downstream and circumferential components from the first dilution aperture 102 and a second portion 120 which extends with axially upstream and circumferential components from the first portion 119 to the second dilution aperture 102. Thus, it is seen that each slot 108D is V-shaped in the plane of the inner wall 66 and the apex 121 of each V-shaped slot 108D is axially downstream of the ends of the slot 108D. The plurality of slots 108A, 108B and 108D and the dilution apertures 102 are arranged to form a loop L extending through the full thickness of the inner wall 66 to accommodate differential thermal expansion between the inner wall 66 and the outer wall 64 of each combustion chamber segment 58, 60. Each slot 108A extends between two adjacent dilution apertures 102 in a first row of circumferentially spaced dilution apertures 102. Each slot 108B extends between a dilution aperture 102 in the first row of dilution apertures 102 and a dilution aperture 102 in a second row of dilution apertures 102 where the first and second rows of dilution apertures 102 are axially spaced. Each slot 108D extends between two adjacent dilution apertures 102 in a second row of circumferentially spaced dilution apertures 102. In each slot 108A, 108B and 108D there may be a small radius of curvature at the, or each, apex to minimise the risk of any crack initiation due to the change in the angle of the slot 108A, 108B, and/or 108D. The small radius may be less than 3 mm.

Figure 12:
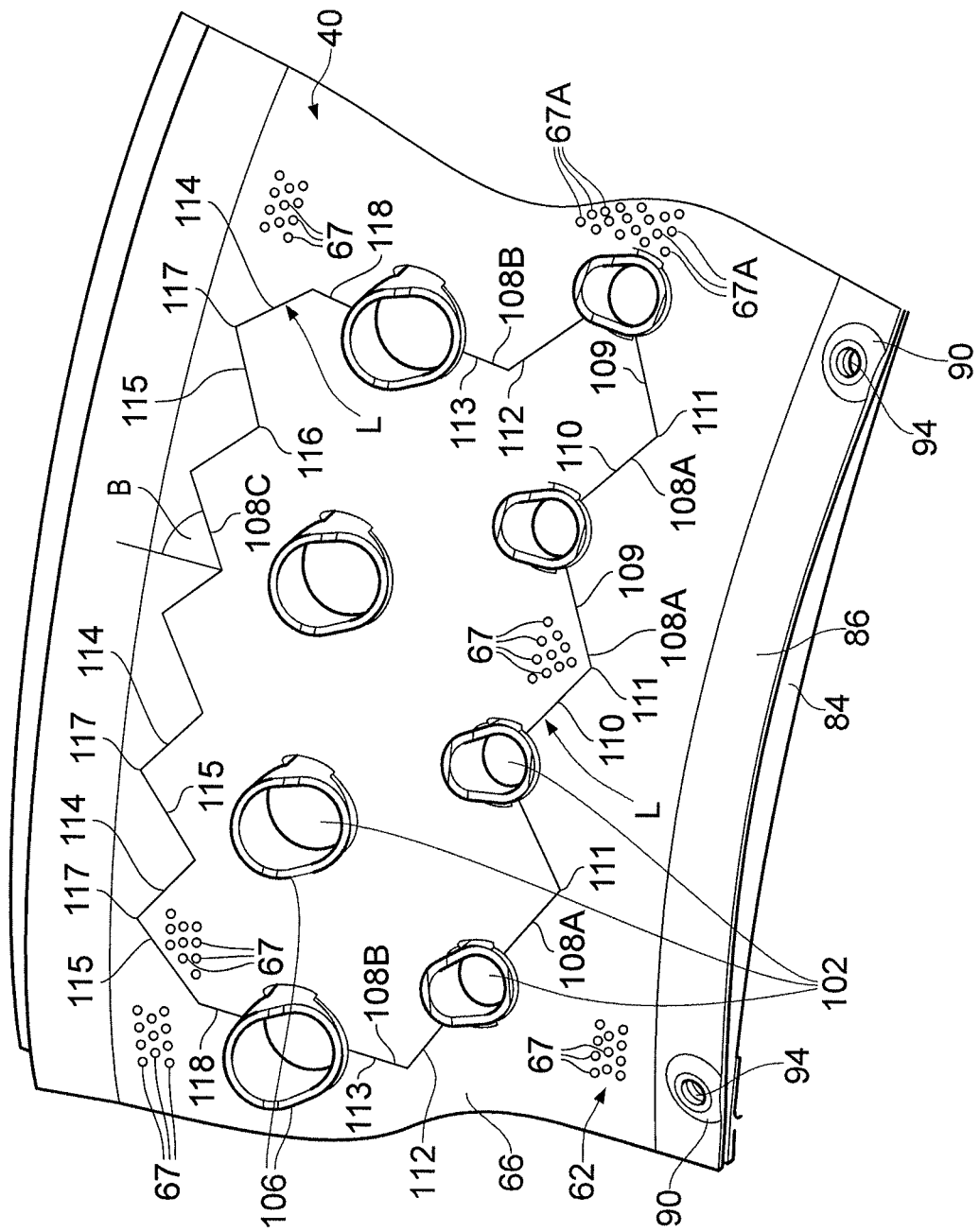
FIG. 12 is a further enlarged perspective view of a hot side of a portion of combustion chamber shown in FIG. 2.

The inner wall 66 of the radially inner annular wall structure 40 and the radially outer annular wall structure 42 has at least one slot 108 extending through the full thickness of the inner wall 66 to accommodate differential thermal expansion between the inner wall 66 and the outer wall 64. The inner wall 66 of the radially inner annular wall structure 40 and the radially outer annular wall structure 42 has a plurality of slots 108A, 108B and 108C extending through the full thickness of the inner wall 66 to accommodate differential thermal expansion between the inner wall 66 and the outer wall 64, as shown in FIG. 12. The radially inner annular wall structure 40 and the radially outer annular wall structure 42 of FIG. 12 are different from those in FIGS. 3 to 11 in that the radially inner annular wall structure 40 and the radially outer annular wall structure 42 are circumferentially continuous and do not comprise segments. Each slot 108A, 108B and 108C in the inner wall 66 of each combustion chamber segment 58, 60 extends between two dilution apertures 102 in the inner wall 66. Each slot 108A, 108B and 108C extends with axial and circumferential components between the two dilution apertures 102 in the inner wall 66. Each slot 108A comprises a first portion 109 which extends with axially upstream and circumferential components from the first dilution aperture 102 and a second portion 110 which extends with axially downstream and circumferential components from the first portion 109 to the second dilution aperture 102. Thus, it is seen that each slot 108A is V-shaped in the plane of the inner wall 66 and the apex of each V-shaped slot 108A is axially upstream of the ends of the slot 108A. Each slot 108B comprises a first portion 112 which extends with axially downstream and circumferential components from the first dilution aperture 102 and a second portion 113 which extends with an axially downstream component from the first portion 112 to the second dilution aperture 102. Thus, it is seen that each slot 108B is also V-shaped in the plane of the inner wall 66. The slot 108C comprises a plurality of portions 114 and 115 which extend with axial and circumferential components and two portions 118 which extend with axial components from the dilution aperture 102 to the second aperture 102 such that the slot 108C extends sinusoidally, e.g. in a zig-zag manner, in the plane of the inner wall 66 between the two adjacent dilution apertures 102. The portions 114 and 115 extend between axially upstream apexes 116 and axially downstream apexes 117. The plurality of slots 108A, 108B and 108C and the dilution apertures 102 are arranged to form a loop L extending through the full thickness of the inner wall 66 to accommodate differential thermal expansion between the inner wall 66 and the outer wall 64. Each slot 108A extends between two adjacent dilution apertures 102 in a first row of circumferentially spaced dilution apertures 102. Each slot 108B extends between a dilution aperture 102 in the first row of dilution apertures 102 and a dilution aperture 102 in a second row of dilution apertures 102 where the first and second rows of dilution apertures 102 are axially spaced. The slot 108C extends between two dilution apertures 102 in the second row of circumferentially spaced dilution apertures 102. The inner wall 66 of the radially inner annular wall structure 40 and the radially outer annular wall structure 42 has a plurality of circumferentially spaced loops L extending through the full thickness of the inner wall 66 to accommodate differential thermal expansion between the inner wall 66 and the outer wall 64. In each slot 108A, 108B and 108D there may be a small radius of curvature at the, or each, apex to minimise the risk of any crack initiation due to the change in the angle of the slot 108A, 108B, and/or 108D. The small radius may be less than 3 mm.

Figure 9:
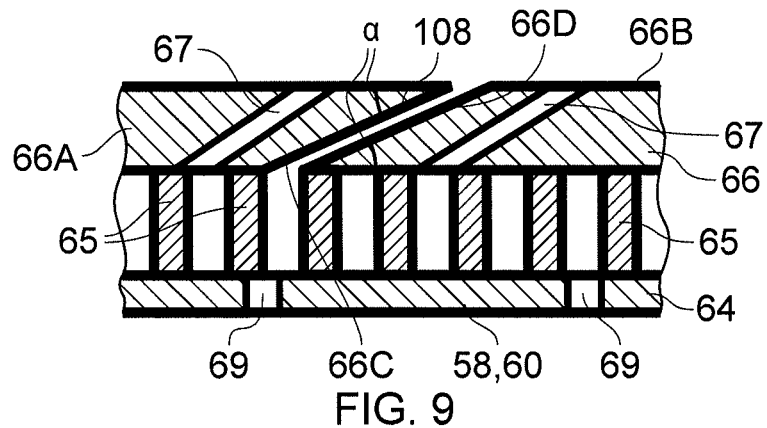
FIG. 9 is a further enlarged cross-sectional view through a combustion chamber segment shown in FIG. 4, showing a slot extending through the full thickness of the inner wall to accommodate differential thermal expansion between the inner wall and the outer wall of the combustion chamber segment.

FIG. 9 is a cross-sectional view in a plane containing the axis of the gas turbine engine 10 through a combustion chamber segment 58, 60 showing one arrangement of slot 108. In this combustion chamber segment 58, 60 the inner wall 66 and the outer wall 64 are connected by pedestals 65 which are integral with the inner wall 66 and the outer wall 64. The inner wall 66 has a plurality of apertures 67 extending there-through and in this example the apertures 67 are arranged at an angle to the surface of the inner wall 66 and the outlet of each aperture 67 is positioned downstream of its inlet. The outer wall 64 has a plurality of apertures 69 extending there-through and in this example the apertures 69 are arranged perpendicular to the surface of the outer wall 64.

In this example both surfaces 66C, 66D of the slot 108 are arranged at an angle α of up to 60° to the surface of the inner wall 66. Both surfaces 66C, 66D of the slot 108 may be arranged at an angle α of between 10° and 60° to the surface of the inner wall 66. Both surfaces 66C, 66D of the slot 108 may be arranged at an angle α of between 10° and 50° to the surface of the inner wall 66. Both surfaces 66C, 66D of the slot 108 may be arranged at an angle α of between 10° and 40° to the surface of the inner wall 66. Both surfaces 66C, 66D of the slot may be arranged at an angle α of between 10° and 30° to the surface of the inner wall 66. Both surfaces 66C, 66D of the slot 108 may be arranged at an angle α of 15° to the surface of the inner wall 66. Both surfaces 66C, 66D of the slot 108 may be arranged at an angle α of 25° to the surface of the inner wall 66. Thus, the surfaces 66C, 66D of the slot 108 are parallel. Alternatively, the surfaces 66C, 66D of the slot 108 may be built such that the surfaces diverge from the cold side of the inner wall 66 to the hot side of the inner wall 66 but the surfaces of the slot are parallel in operation. Both surfaces 66C, 66D of the slot 108 are arranged at an angle α to the inner surface of the inner wall 66 and the outer surface of the inner wall 66.

The slot 108 is defined between two parallel surfaces 66C, 66D and the surfaces 66C, 66D are arranged at an angle α to the inner surface of the inner wall 66 and at an angle to the outer surface of the inner wall 66. The slot 108 intersects the inner surface of the inner wall 66 at a position downstream of the position at which the slot 108 intersects the outer surface of the inner wall 66. The parallel surfaces 66C and 66D are arranged on upstream and downstream portions 66A and 66B respectively of the inner wall 66. The surface 66C at the downstream end of the upstream portion 66A is arranged at an angle α to the inner surface of the inner wall 66 and at an angle α to the outer surface of the inner wall 66 and the surface 66D at the upstream end of the downstream portion 66B is arranged at an angle α to the inner surface of the inner wall 66 and at an angle α to the outer surface of the inner wall 66.

The apertures 67 and the slot 108 may be arranged at the same angle α to the surface of the inner wall 66. The apertures 67 and the slot 108 may be arranged at different angles to the surface of the inner wall 66 but so that the apertures 67 do not intersect with the slot 108. Alternatively, the apertures 67 and the slot 108 may be arranged at different angles to the surface of the inner wall 66 but so that the apertures 67 do intersect with the slot 108.

The combustion chamber segments 58, 60, the circumferentially continuous radially inner annular wall structure 40 or the circumferentially continuous radially outer annular wall structure 42 are manufactured by additive layer manufacturing. The surfaces 66C and 66D of the slot 108 are angled to the build direction to improve the surface finish of the surfaces any poor surface finish is of sufficiently low mechanical integrity so as not to prevent closing of the gap due to differential thermal expansion. The upstream end of the downstream portion 66B is supported during the additive layer manufacturing process by the pedestals 65 and thus other support structure is required and thus pedestals 65 are provided at the upstream end of the downstream portion 66B at, or adjacent and downstream of the, position at which the slot 108 intersects the outer surface of the inner wall 66.

Figure 10:
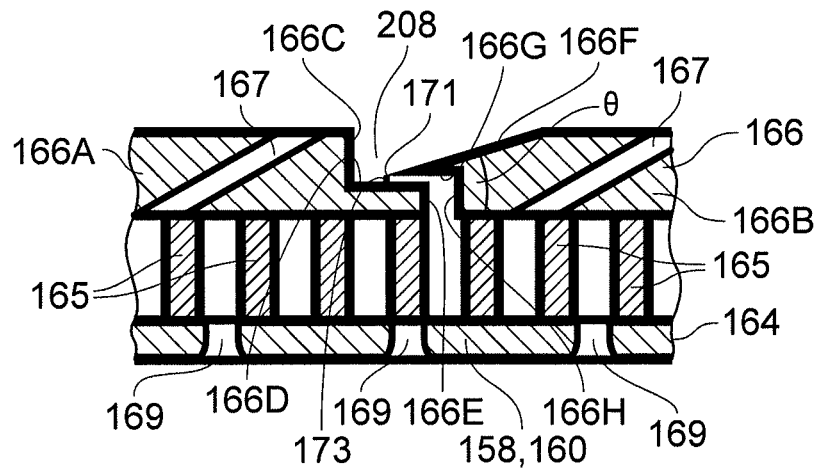
FIG. 10 is a further enlarged cross-sectional view through a combustion chamber segment shown in FIG. 4 showing an alternative slot extending through the full thickness of the inner wall to accommodate differential thermal expansion between the inner wall and the outer wall of the combustion chamber segment.

FIG. 10 is a cross-sectional view in a plane containing the axis of the gas turbine engine 10 through a combustion chamber segment 158, 160 showing an alternative arrangement of slot 208. In this combustion chamber segment 158, 160 the inner wall 166 and the outer wall 164 are connected by pedestals 165 which are integral with the inner wall 166 and the outer wall 164. The inner wall 166 has a plurality of apertures 167 extending there-through and in this example the apertures 167 are arranged at an angle to the surface of the inner wall 166 and the outlet of each aperture 167 is positioned downstream of its inlet. The outer wall 164 has a plurality of apertures 169 extending there-through and in this example the apertures 169 are arranged perpendicular to the surface of the outer wall 164 and the apertures 169 have bell mouth shaped inlets. The apertures 169 provide impingement cooling of the inner wall 166.

In this example the downstream end of the upstream portion 166A has a first surface portion 166C extending perpendicularly from the inner surface of the inner wall 166, a second surface portion 166D extending parallel to the inner surface and the outer surface of the inner wall 166 and a third surface portion 166E extending perpendicularly to the outer surface of the inner wall 166. The upstream end of the downstream portion 166B has a first surface portion 166F extending at an angle θ to the inner surface of the inner wall 166, a second surface portion 166G extending parallel to the inner surface and the outer surface of the inner wall 166 and a third surface portion 166H extending perpendicularly to the outer surface of the inner wall 166. The upstream end of the downstream portion 166B overlaps, but is spaced from, the downstream end of the upstream portion 166A and the second surface portions 166D and 166G of the upstream and downstream portions 166A and 166B are parallel. The surfaces 166F and 166G at the upstream end of the downstream portion 166B of the inner wall 166 taper to an edge 171. This arrangement of slot 208 has reduced leakage compared to slot 108.

In this example first surface portion 166F of the slot 208 is arranged at an angle θ of up to 60° to the surface of the inner wall 166. The first surface portion 166F of the slot 208 may be arranged at an angle θ of between 10° and 60° to the surface of the inner wall 166. The first surface portion 166F of the slot 208 may be arranged at an angle θ of between 10° and 50° to the surface of the inner wall 166. The first surface portion 166F of the slot 208 may be arranged at an angle θ of between 10° and 40° to the surface of the inner wall 166. The first surface portion 166F of the slot 208 may be arranged at an angle θ of between 10° and 30° to the surface of the inner wall 166. The first surface portion 166F of the slot 208 may be arranged at an angle θ of 15° to the surface of the inner wall 166 or the first surface portion 166F of the slot 208 may be arranged at an angle θ of 25° to the surface of the inner wall 166.

The apertures 167 and the slot 208 may be arranged at the same angle θ to the surface of the inner wall 166. The apertures 167 and the slot 208 may be arranged at different angles to the surface of the inner wall 166 but so that the apertures 167 do not intersect with the slot 208. Alternatively, the apertures 167 and the slot 208 may be arranged at different angles to the surface of the inner wall 166 but so that the apertures 167 do intersect with the slot 208.

Figure 13:
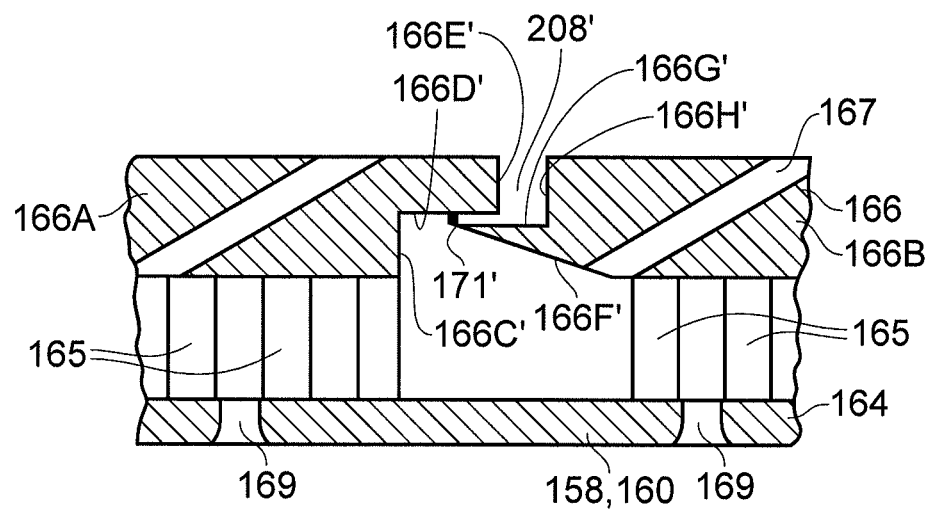
FIG. 13 is a further enlarged cross-sectional view through a combustion chamber segment shown in FIG. 4, showing a slot extending through the full thickness of the inner wall to accommodate differential thermal expansion between the inner wall and the outer wall of the combustion chamber segment.

FIG. 13 is a cross-sectional view in a plane containing the axis of the gas turbine engine 10 through a combustion chamber segment 158, 160 showing an alternative arrangement of slot 208'. In this combustion chamber segment 158, 160 the inner wall 166 and the outer wall 164 are connected by pedestals 165 which are integral with the inner wall 166 and the outer wall 164. The inner wall 166 has a plurality of apertures 167 extending there-through and in this example the apertures 167 are arranged at an angle to the surface of the inner wall 166 and the outlet of each aperture 167 is positioned downstream of its inlet. The outer wall 164 has a plurality of apertures 169 extending there-through and in this example the apertures 169 are arranged perpendicular to the surface of the outer wall 164 and the apertures 169 have bell mouth shaped inlets. The apertures 169 provide impingement cooling of the inner wall 166.

The arrangement of the slot 208' is similar to that of the slot 208 in FIG. 10, but in this example the downstream end of the upstream portion 166A has a first surface portion 166C' extending perpendicularly from the outer surface of the inner wall 166, a second surface portion 166D' extending parallel to the inner surface and the outer surface of the inner wall 166 and a third surface portion 166E' extending perpendicularly to the outer surface of the inner wall 166. The upstream end of the downstream portion 166B has a first surface portion 166F' extending at an angle θ to the outer surface of the inner wall 166, a second surface portion 166G' extending parallel to the inner surface and the outer surface of the inner wall 166 and a third surface portion 166H' extending perpendicularly to the inner surface of the inner wall 166. The downstream end of the upstream portion 166A overlaps, but is spaced from, the upstream end of the downstream portion 166B and the second surface portions 166D' and 166G' of the upstream and downstream portions 166A and 166B are parallel. The surfaces 166F' and 166G' at the upstream end of the downstream portion 166B of the inner wall 166 taper to an edge 171'. This arrangement of slot 208' also has reduced leakage compared to slot 108.

Figure 14:
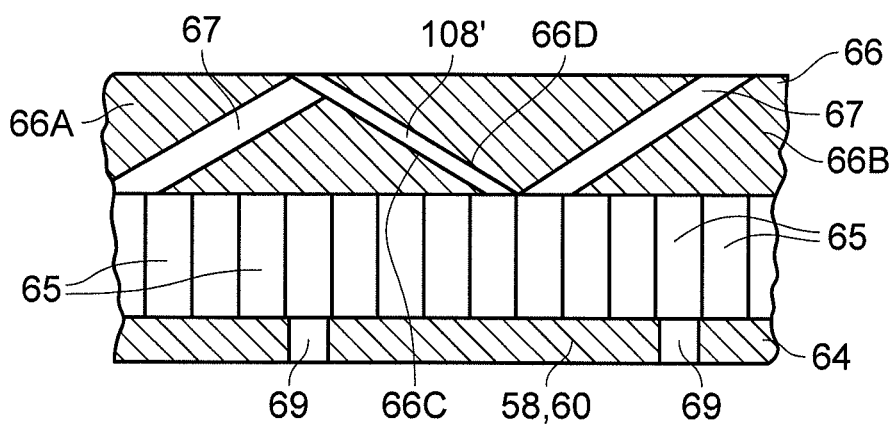
FIG. 14 is a further enlarged cross-sectional view through a combustion chamber segment shown in FIG. 4, showing a slot extending through the full thickness of the inner wall to accommodate differential thermal expansion between the inner wall and the outer wall of the combustion chamber segment.

FIG. 14 is a cross-sectional view in a plane containing the axis of the gas turbine engine 10 through a combustion chamber segment 58, 60 showing a further arrangement of slot 108'. The slot 108' is substantially the same as that shown in FIG. 9 but the slot 108' is angled in an upstream direction from the outer surface to the inner surface of the inner wall 66 whereas in FIG. 9 the slot 108 is angled in a downstream direction from the outer surface to the inner surface of the inner wall 66.

The combustion chamber segments 58, 60, the circumferentially continuous radially inner annular wall structure 40 or the circumferentially continuous radially outer annular wall structure 42 are manufactured by additive layer manufacturing. The upstream end of the downstream portion 166B is supported during the additive layer manufacturing process by the pedestals 165 and thus other support structure is required and thus pedestals 165 are provided at the upstream end of the downstream portion 166B at, or adjacent and downstream of the, position at which the slot 208 intersects the outer surface of the inner wall 166. The downstream portion 166B of the inner wall 166 is built by the additive layer manufacturing process from the edge 171 and a frangible feature 173 is provided between the second surface portion 166D of the upstream portion 166 of the inner wall 166 and the edge 171 on the downstream portion 166B of the inner wall 166. The frangible feature 173 is constructed such that it will break due to the load imposed by the differential thermal expansion between the inner wall 166 and the outer wall 164 during operation of the combustion chamber 16.

Figure 15:
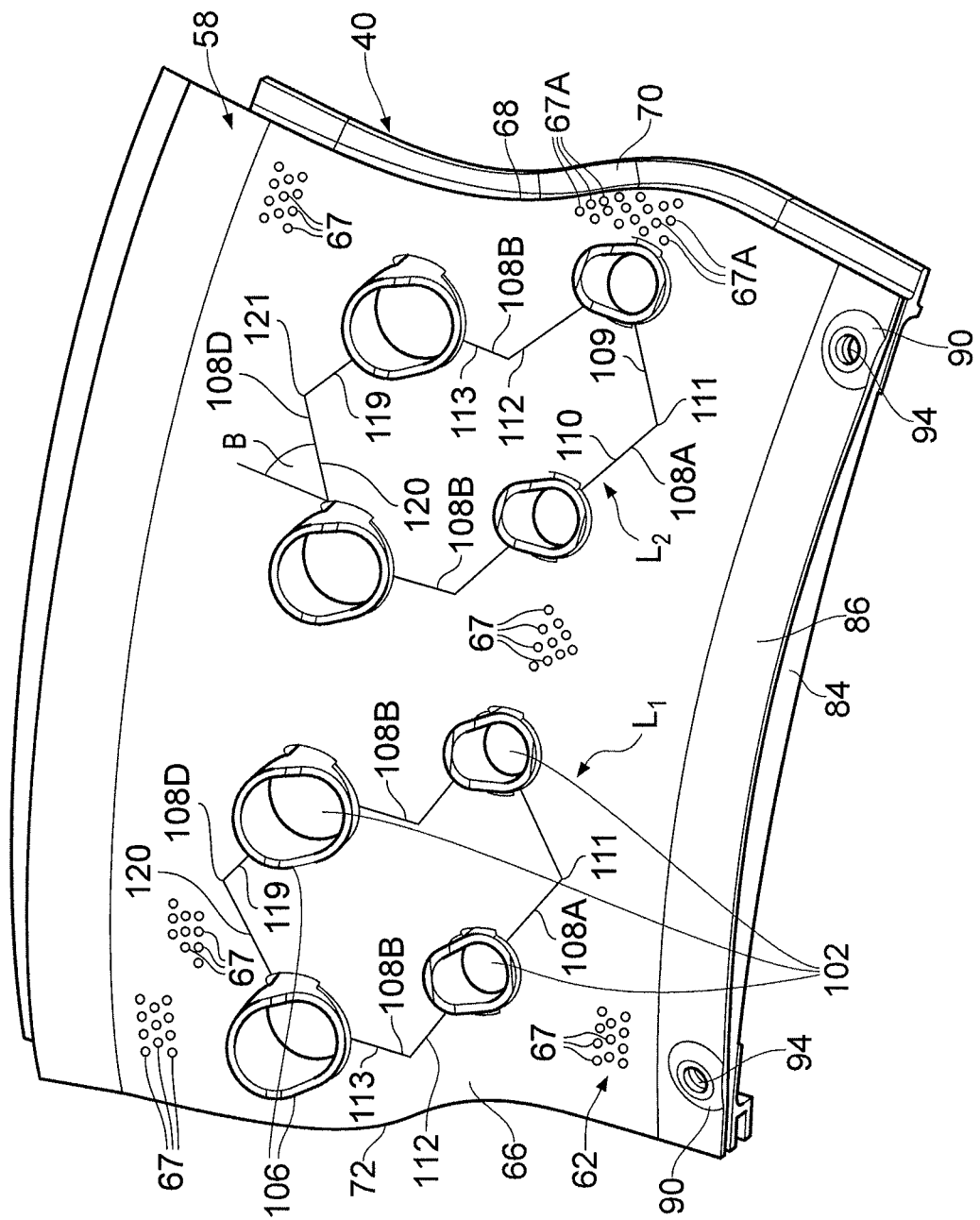
FIG. 15 is a further enlarged perspective view of a hot side of an alternative combustion chamber segment shown in FIG. 3.

The inner wall 66 of each combustion chamber segment 58, 60 has a plurality of slots 108A, 108B and 108D extending through the full thickness of the inner wall 66 to accommodate differential thermal expansion between the inner wall 66 and the outer wall 64, as shown in FIG. 15. The arrangement in FIG. 15 is similar to that in FIG. 11 but there are two circumferentially spaced loops L1 and L2.

The slot, slots, loop or loops provide one or more small gaps in the inner wall 66, 166 of the combustion chamber segments 58, 60 or the circumferentially continuous radially inner annular wall structure 40 or the circumferentially continuous radially outer annular wall structure 42 and the small gap or gaps are able to close to accommodate the greater expansion of the inner wall 66, 166 with respect to the outer wall 64, 164 without transmitting stresses into the combustion chamber segment 58, 60 or the circumferentially continuous radially inner annular wall structure 40 or the circumferentially continuous radially outer annular wall structure 42. The gap is large enough to accommodate the differential thermal expansion between the inner wall 66, 166 and the outer wall 64, 164 but yet is small enough to control leakage of coolant through the slot 108, 208 from the space between the inner wall 66, 166 and the outer wall 64, 164. In operation of the combustion chamber 16 the outer wall 64, 164 may expand by up to 0.5 mm less than the inner wall 66, 166.

It is to be noted that in all the embodiments of the present disclosure that the portions 109, 110, 112, 114, 115, 119 and 120 of the slots 108A, 108B, 108C and 108D which extend with axial and circumferential components are arranged such that they are arranged at an angle β relative to the build direction, which is also the axial direction, or longitudinal direction, of the combustion chamber segment 58, 60 or the annular wall. The angle β is up to 60° from the build direction or axial direction or greater than 30° from the circumferential direction.

The combustion chamber may comprise at least one annular wall, the at least one annular wall comprising at least one box like structure, the at least one box like structure comprising an inner wall, an outer wall, an upstream end wall and a downstream end wall, the inner wall being spaced radially from the outer wall, the outer wall having a plurality of apertures for the supply of coolant into the box like structure, the inner wall, the outer wall, the upstream end wall and the downstream end wall being integral, the upstream end of the at least one annular wall having features to secure the at least one annular wall to an upstream ring structure and a downstream end of the at least one annular wall having features to mount the at least one annular wall on a downstream ring structure, the inner wall having at least one slot extending through the full thickness of the inner wall to accommodate differential thermal expansion between the inner wall and the outer wall.

The combustion chamber may comprise two annular walls, each annular wall comprising at least one box like structure, each box like structure comprising an inner wall, an outer wall, an upstream end wall and a downstream end wall, the inner wall being spaced radially from the outer wall, the outer wall having a plurality of apertures for the supply of coolant into the box like structure, the inner wall, the outer wall, the upstream end wall and the downstream end wall of each box like structure being integral, an upstream end of the each annular wall having features to secure the annular wall to an upstream ring structure and a downstream end of each annular wall having features to mount the annular wall on a downstream ring structure, the inner wall of each box like structure having at least one slot extending through the full thickness of the inner wall to accommodate differential thermal expansion between the inner wall and the outer wall.

The integral box like structure is a single piece structure, e.g. a unitary structure or a monolithic structure.

The description has indicated that each end of a slot terminates at a dilution aperture. However, it may be possible for each slot to form a continuous loop without ends. Alternatively, each end of a slot may terminate at another aperture, e.g. a coolant aperture. Additionally, a first end of a slot may terminate at a dilution aperture and a second end of the slot may terminate at a coolant aperture. The termination of a slot at an aperture has the advantage that the end of the slot does not act as an initiation site for a crack. Each annular wall of the combustion chamber may comprise one or more loops. Each combustion chamber segment may comprise one or more loops. Each of the loops may comprise one or more slots and one or more dilution apertures. Alternatively each loop may comprise a single slot. Each loop may be arranged to surround a plurality of coolant apertures in the inner wall. For example there may between ten and a hundred loops in each combustion chamber segment and each of the loops surrounds a plurality of coolant apertures in the inner wall. The loops may be arranged circumferentially and axially in the inner wall of each combustion chamber segment or in the annular wall of the combustion chamber. The loops may be arranged in a diamond pattern in each combustion chamber segment or in the annular wall of the combustion chamber.

Each combustion chamber segment, or the annular wall of the combustion chamber, comprises an integral structure, e.g. a single piece structure, a unitary structure or a monolithic piece, formed by additive layer manufacturing. The apertures in the outer wall, the apertures in the inner wall and any structure or structures, e.g. cellular structure or pedestals, between the inner and outer wall are all formed by the additive layer manufacturing (ALM) process. The additive layer manufacturing process may be direct laser deposition (DLD), selective laser sintering, direct electron beam deposition, laser powder bed etc. The combustion chamber segments, or the annular wall of the combustion chamber, are built using the additive layer manufacturing by initially starting from the upstream end, or the downstream end, of the combustion chamber segment or the annular wall of the combustion chamber. The combustion chamber segment, or the annular wall of the combustion chamber, is built up layer by layer using additive layer manufacturing in the longitudinal, axial, direction of the wall which corresponds to the direction of flow of hot gases over the inner surface of the inner wall.

The combustion chamber segments, or the annular wall of the combustion chamber, may be formed from a nickel base superalloy, a cobalt base superalloy or an iron base superalloy. The nickel base superalloy may be C263 or CM247LC.

Although the description has referred to the provision of cooling apertures, e.g. effusion cooling apertures, extending through the inner wall of the combustion chamber segments, or annular wall of the combustion chamber, it may be equally possible that the inner wall does not have any cooling apertures, e.g. effusion cooling apertures extending there-through.

A thermal barrier coating may be provided on the inner surface of the inner wall of the combustion chamber segments or on the inner surface of the inner wall of the annular wall of the combustion chamber. The thermal barrier coating may comprise a ceramic material, for example the ceramic material may comprise zirconia or stabilised zirconia. The thermal barrier coating may be provided on the surface of the inner wall of the combustion chamber segments, or annular wall of the combustion chamber, by plasma spraying, physical vapour deposition, e.g. electron beam physical vapour deposition, or chemical vapour deposition. A bond coating may be provided on the surface of the inner wall of the combustion chamber segments, or the annular wall of the combustion chamber, before the thermal barrier coating. The bond coating may comprise a MCrAlY coating, where M is one or more of nickel, cobalt and iron, or an aluminide coating, e.g. a simple aluminide, a chromium aluminide, a platinum aluminide, platinum chromium aluminide or a silicide aluminide.

The gas turbine engine may be an aero gas turbine engine, an industrial gas turbine engine, a marine gas turbine engine or an automotive gas turbine engine. The aero gas turbine engine may be a turbofan gas turbine engine, a turbo-shaft gas turbine engine, a turbo-propeller gas turbine engine or a turbojet gas turbine engine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A combustion chamber comprising at least one annular wall, an upstream ring structure and a downstream ring structure, the at least one annular wall comprising at least one box shaped structure, the at least one box shaped structure comprising an inner wall, an outer wall, an upstream end wall and a downstream end wall, the inner wall being spaced radially from the outer wall, the outer wall having a plurality of apertures for the supply of coolant into the at least one box shaped structure, the inner wall, the outer wall, the upstream end wall and the downstream end wall being a unitary structure formed by additive layer manufacturing, an upstream end of the at least one annular wall having features to secure the at least one annular wall to the upstream ring structure and a downstream end of the at least one annular wall having features to mount the at least one annular wall on the downstream ring structure, the inner wall having at least one slot extending through a full thickness of the inner wall to accommodate differential thermal expansion between the inner wall and the outer wall, wherein at least one of surfaces of the at least one slot is arranged at an angle of up to 60° to a surface of the inner wall, wherein the at least one annular wall has a plurality of circumferentially spaced dilution apertures extending there-through and each of the at least one slot extending between and interconnecting two adjacent dilution apertures, wherein the each of the at least one slot extends with axial and circumferential components between the two adjacent dilution apertures, wherein the each of the at least one slot comprises a first portion extending with the axial and the circumferential components from a first dilution aperture and a second portion extending with axial and circumferential components from the first portion to a second dilution aperture, the first dilution aperture and the second dilution aperture being the two adjacent dilution apertures and wherein the each of the at least one slot is located between the two adjacent dilution apertures, extends sinusoidally, and is arranged in any direction between the two adjacent dilution apertures.

2. The combustion chamber as claimed in claim 1 wherein the at least one annular wall comprising a plurality of combustion chamber segments, each combustion chamber segment extending a full length of the at least one annular wall, the each combustion chamber segment comprising a box shaped structure, the box shaped structure comprising a frame structure, an inner wall and an outer wall, the inner wall being spaced radially from the outer wall, the outer wall having a plurality of apertures for the supply of coolant into the box shaped structure, the frame structure, the inner wall and the outer wall being integral, an upstream end of the each combustion chamber segment having features to secure the combustion chamber segment to the upstream ring structure and a downstream end of the each combustion chamber segment having features to mount the combustion chamber segment on the downstream ring structure, the inner wall of the each combustion chamber segment having at least one slot extending through a full thickness of the inner wall to accommodate differential thermal expansion between the inner wall and the outer wall.

3. The combustion chamber as claimed in claim 1 wherein the at least one slot includes a plurality of slots extending through the full thickness of the inner wall to accommodate differential thermal expansion between the inner wall and the outer wall.

4. The combustion chamber as claimed in claim 3 wherein the plurality of slots and the plurality of circumferentially spaced dilution apertures are arranged to form a loop extending through the full thickness of the inner wall to accommodate differential thermal expansion between the inner wall and the outer wall.

5. The combustion chamber as claimed in claim 1 wherein the at least one slot is arranged to form a loop extending through the full thickness of the inner wall to accommodate differential thermal expansion between the inner wall and the outer wall.

6. The combustion chamber as claimed in claim 1 wherein the at least one of the surfaces of the at least one slot is arranged at the angle of between 10° and 30° to the surface of the inner wall.

7. The combustion chamber as claimed in claim 1 wherein both surfaces of the at least one slot are arranged at the angle of 10° to 60° to the surface of the inner wall.

8. The combustion chamber as claimed in claim 7 wherein the both surfaces of the at least one slot are arranged at the angle of between 10° and 30° to the surface of the inner wall.

9. The combustion chamber as claimed in claim 7 wherein the both surfaces of the at least one slot are parallel.

10. The combustion chamber as claimed in claim 9 wherein the at least one slot is defined between a downstream portion and an upstream portion of the inner wall, the at least one slot defined between two parallel surfaces, the two parallel surfaces arranged on the upstream portion and the downstream portion of the inner wall, the two parallel surfaces arranged at an angle to the inner surface of the inner wall and at an angle to the outer surface of the inner wall, the at least one slot intersecting the inner surface of the inner wall at a position downstream of the position at which the at least one slot intersects the outer surface of the inner wall.

11. The combustion chamber as claimed in claim 10 wherein a downstream end of the upstream portion has a surface being arranged at an angle to the inner surface of the inner wall and at an angle to the outer surface of the inner wall and an upstream end of the downstream portion has a surface arranged at an angle to the inner surface of the inner wall and at an angle to the outer surface of the inner wall.

12. The combustion chamber as claimed in claim 1 wherein a downstream end of an upstream portion of the inner wall has a first surface portion extending perpendicularly from the inner surface of the inner wall, a second portion extending parallel to the inner surface and an outer surface of the inner wall and a third portion extending perpendicularly to the outer surface of the inner wall, and a upstream end of an downstream portion of the inner wall has a first portion extending at an angle to the inner surface of the inner wall, a second portion extending parallel to the inner surface and the outer surface of the inner wall and a third portion extending perpendicularly to the outer surface of the inner wall.

13. The combustion chamber as claimed in claim 1 wherein a plurality of members are secured to and interconnect an outer surface of the inner wall and an inner surface of the outer wall.

14. The combustion chamber as claimed in claim 1 wherein the inner wall has a plurality of inner wall apertures each having at least one surface angled with respect to the surface of the inner wall, the at least one slot disposed between at least two of the plurality of inner wall apertures, wherein the at least one of the surfaces of the at least one slot is arranged at the angle of 10° to 60° to the surface of the inner wall, the angle of the at least one of the surfaces of the at least one slot being different than the angle of the at least one surface of the each of the plurality of inner wall apertures.

15. A combustion chamber segment, the combustion chamber segment extending a full length of the combustion chamber, the combustion chamber segment comprising a box shaped structure, the box shaped structure comprising a frame structure, an inner wall and an outer wall, the inner wall being spaced from the outer wall, the outer wall having a plurality of apertures for the supply of coolant into the box shaped structure, the frame structure, the inner wall and the outer wall being a unitary structure formed by additive layer manufacturing, an upstream end of the combustion chamber segment having features to secure the combustion chamber segment to an upstream ring structure and a downstream end of the combustion chamber segment having features to mount the combustion chamber segment on a downstream ring structure, the inner wall having at least one slot extending through the full thickness of the inner wall to accommodate differential thermal expansion between the inner wall and the outer wall, wherein at least one of surfaces of the at least one slot is arranged at an angle of up to 60° to a surface of the inner wall, wherein the at least one annular wall has a plurality of circumferentially spaced dilution apertures extending there-through and each of the at least one slot extending between and interconnecting two adjacent dilution apertures, wherein the each of the at least one slot extends with axial and circumferential components between the two adjacent dilution apertures, wherein the each of the at least one slot comprises a first portion extending with the axial and the circumferential components from the first dilution aperture and a second portion extending with the axial and the circumferential components from the first portion to the second dilution aperture, the first dilution aperture and the second dilution aperture being the two adjacent dilution apertures and wherein the each of the at least one slot is located between the two adjacent dilution apertures, extends sinusoidally, and is arranged in any direction between the two adjacent dilution apertures.

16. The combustion chamber segment as claimed in claim 15 wherein the inner wall has a plurality of inner wall apertures each having at least one surface angled with respect to the surface of the inner wall, the at least one slot disposed between at least two of the plurality of inner wall apertures, wherein the at least one of the surfaces of the at least one slot is arranged at the angle of 10° to 60° to the surface of the inner wall, the angle of the at least one of the surfaces of the at least one slot being different than the angle of the at least one surface of the each of the plurality of inner wall apertures.

* * * * *